United States Patent Office.

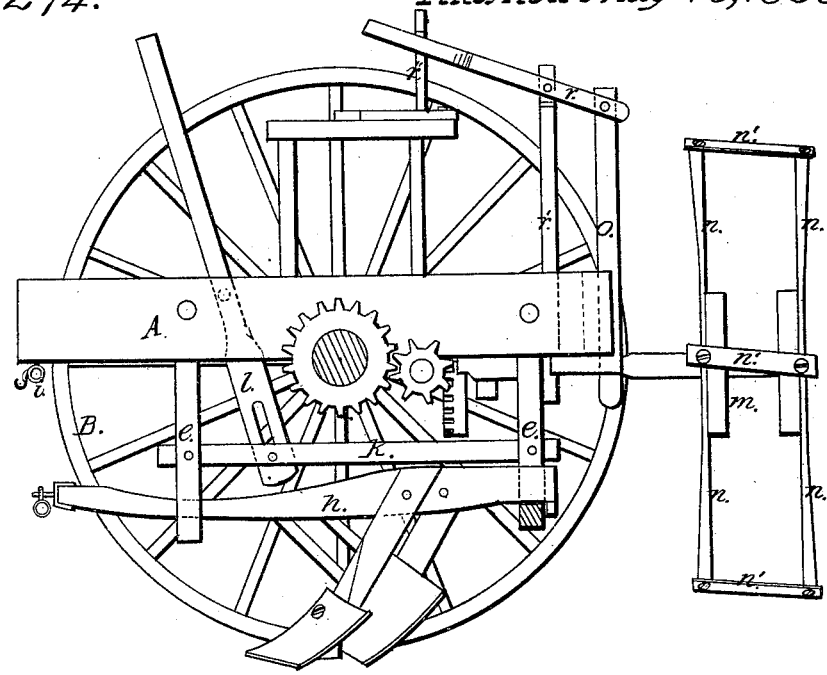
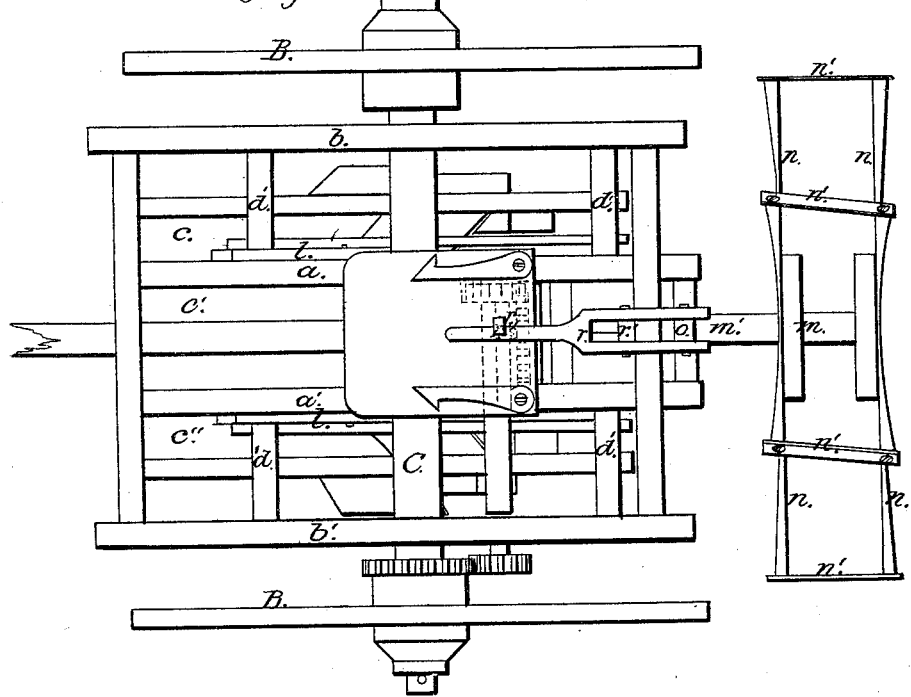

FIELDING L. KIRTLEY, OF CLEYBORNE, TEXAS.

Letters Patent No. 90,274, dated May 18, 1869.

IMPROVEMENT IN COMBINED PLOW-CARRIER AND COTTON-CHOPPER.

The Schedule referred to in these Letters Patent and making part of the same.

*To all whom it may concern:*

Be it known that I, FIELDING L. KIRTLEY, of Cleyborne, in the county of Johnson, and State of Texas, have invented a new and improved Combined Plow-Carrier and Cotton-Chopper; and I do hereby declare that the following is a full, clear, and exact description of the construction and operation of the same, reference being had to the accompanying drawings, making a part of this specification, in which—

Figure 1 is a plan view.

Figure 2 is a side elevation.

This invention relates to a frame mounted upon two wheels, and arranged for supporting plows while in the act of turning up the earth; and It consists in so attaching the plows to the frame that the former shall not partake of the rising and falling motions of the latter, as in passing over rough ground, and that the plows may be easily shifted, so as to substitute one kind of plow for another, and that the plows may be drawn directly by the traces, and not through the attachment to the frame.

The invention also consists in combining with the plow-carrier, a revolving wheel, placed at right angles with the line of direction of the plows, and provided with a number of horizontal cutters at the ends of its spokes, for the purpose of cutting square across the ridges of earth cast up by the plows, in which cotton-seed is sown, and dividing said ridges into isolated hills, each containing one or more cotton-plants.

In the drawings—

A is a wooden frame, mounted on two wheels B B, which are placed upon an axle, C.

There is nothing peculiar in the construction or function of the frame, it being divided into three equal longitudinal spaces, $c$ $c'$ $c''$, by means of two bars $a$ $a'$, placed within and parallel to the side pieces $b$ $b'$ of the frame.

In the two side spaces $c$ $c''$ are placed hangers, two to each space, one near each end of the space, the same consisting of cross-bars $d'$ $d'$, placed transversely of the spaces, and having their ends placed in bearings in the bars $a$ $b$ and $a'$ $b'$, so as to rotate freely therein, and having pendants $e$ mortised into their under sides, and extending downward to within, say a foot of the bottoms of the wheels, said pendants having each a longitudinal slot, reaching nearly its whole length, which slots are for the reception of the plow-beams $h$.

There being two hangers on each side of the frame, it is thus accommodated to the reception of two plow-beams, each of which bears two plows.

The hangers serve simply to keep the plows upright, the beams not being fastened in any manner to the hangers, but being capable of removal and adjustment with the utmost ease, so as that one sort of plow may be substituted for another, and after the land has been "bedded" for cotton, as it is called, it may be "barred off" by another kind of plow.

The slots should extend far enough below the beams to prevent the latter from coming in contact with the bottom of the hangers, which contact, if it takes place, is liable to draw the beams out of the ground, to a greater or less extent, a result especially liable to take place when the frame is drawn over uneven ground.

The plow-beams not being connected with the frame, must, it is obvious, be provided with separate means of draught.

Accordingly, I attach a single-tree to the front of each beam, and with the single-tree connect the drawing-apparatus of the harness.

But as it is necessary that the frame A, which steadies the plows, should proceed at an equal rate with the plows, I use forked traces, one branch extending to the plow-beams, as just described, and the other branch proceeding to a whiffle-tree, $i$, attached to the under side of the front cross-beam of the frame A, in front of each plow-beam.

In order to throw the plows back or forward, or raise them out of the earth, I connect the pair of hangers, on each side, by a rod, $k$, pivoted to each hanger, and to these connecting-rods I pivot the lower extremities of levers $l$ $l$, which have their fulcra in the beams $a$ $a'$, so that said levers, at their upper ends, are in convenient proximity to the driver's seat.

The draught of the plows, by connection direct with the team, instead of attachment to the plow-frame, is much the more economical expenditure of power, causing the plows to cut furrows of a given depth, with considerable less difficulty to the animals than as though the beams were connected with the frame.

The successful cultivation of cotton requires that the plants should grow in isolated hills.

The seed is first sown in continuous drills, and after it comes up it is necessary that the plants should be "brought to a stand," as it is termed, that is, should be "chopped out" into separate bunches, and that trenches should be dug between the bunches.

This chopping and trenching-process is all performed at one and the same operation by my chopper, the same consisting of a hub, $m$, attached to a shaft, $m'$, placed lengthwise of the middle space $c'$ of the frame A, and connected, by means of suitable gearing, with one of the driving-wheels B, so as to receive a rotary motion on its axis.

The hub $m$ is provided with spokes $n$ $n$, radiating in pairs, so as to form a felloeless wheel, placed at right angles to the line of direction of the plow-frame.

At the outer end of each pair of spokes is placed a blade, $n'$, not in a direction directly transverse of the hub, but diagonal of the hub, so as to make a drawing cut.

These blades, as the wheel revolves, cut the beds in which the cotton grows, transversely into hills, leaving spaces between them of greater or less width, according to the number of the blades.

The shaft $m'$ passes through an apparatus for regulating its height above the ground, the same consisting of an upright, o, just at the rear of the frame, made capable of sliding up and down, and jointed, at its top, to a lever, r, having its fulcrum on a post, r', set in the rear of the frame A, the said lever extending forward to the driver's seat, and passing under a catch, r'', attached thereto.

By means of this apparatus, the chopping-wheel may be elevated to pass an obstacle, or may be set to suit the height of the horses used to draw the team.

This chopper is calculated to do the hilling for four plows. As hands work in Texas, at least six are required to do the same work.

The apparatus hereinbefore described is simple and cheap in construction, and most effective in operation.

Having thus described my invention,

What I claim as new, and desire to secure by Letters Patent, is—

1. The combination of the cotton-chopper m, m', n, and n', with the frame A and hangers d e, as and for the purpose described.

2. The slotted and swinging hangers d e, as and for the purpose described.

3. The slotted swinging hangers d e, in combination with the connecting-rod k and lever l, as and for the purpose specified.

4. The shaft m' of the cotton-chopper, in combination with the lifting-apparatus o r, as and for the purpose described.

5. The plow-beams h, each provided with two plows, and made so as to be capable of being readily shifted into or out of the hangers, as described.

F. L. KIRTLEY.

Witnesses:
   CHAS. A. PETTIT,
   SOLON C. KEMON.